US006487361B2

(12) United States Patent
Galt et al.

(10) Patent No.: US 6,487,361 B2
(45) Date of Patent: Nov. 26, 2002

(54) METHOD AND APPARATUS FOR CHANGING PHASE OF VIDEO PROGRAM MATERIAL TAKEN FROM 24 FRAME PER SECOND FILM

(75) Inventors: John J. Galt, Glendale, CA (US); James B. Pearman, Glendale, CA (US)

(73) Assignees: Sony Corporation, Culver City, CA (US); Sony Electronics, Inc., Culver City, CA (US)

( * ) Notice: Subject to any disclaimer, the term of this patent is extended or adjusted under 35 U.S.C. 154(b) by 60 days.

(21) Appl. No.: 09/844,834

(22) Filed: Apr. 27, 2001

(65) Prior Publication Data

US 2002/0126985 A1 Sep. 12, 2002

Related U.S. Application Data

(63) Continuation of application No. 09/465,118, filed on Dec. 16, 1999, which is a continuation of application No. 09/167,073, filed on Oct. 6, 1998, now abandoned, which is a continuation of application No. 08/770,405, filed on Dec. 20, 1996, now abandoned.

(51) Int. Cl.[7] .................................................. H04N 5/93
(52) U.S. Cl. ........................................ 386/52; 386/131
(58) Field of Search ........................ 386/1, 4, 52, 110, 386/129, 131; 345/328; 348/441, 443, 459, 423.1, 558

(56) References Cited

U.S. PATENT DOCUMENTS 4,709,277 A   11/1987   Ninomiya et al.
4,998,167 A   3/1991    Jaqua
5,231,512 A   7/1993    Ebihara et al.
5,600,376 A * 2/1997    Casavant et al. ........ 348/423.1
5,625,739 A   4/1997    Kotani
6,297,848 B1 * 10/2001   Westerman ................. 348/441
6,370,198 B1 * 4/2002    Washino ..................... 348/441

FOREIGN PATENT DOCUMENTS

EP   0 685 968 A2   12/1995
GB   0 473 322      4/1992
GB   2 265 782 A    10/1993
WO   WO/94/01971    1/1994

OTHER PUBLICATIONS

Karleen S. McAllester AVID, Media Match, A Guide to Film–Tape Transfer, Chapter Two, pp. 18–21.

\* cited by examiner

*Primary Examiner*—Thai Tran
*Assistant Examiner*—Christopher Omaku
(74) *Attorney, Agent, or Firm*—Haverstock & Owens LLP (57) ABSTRACT

A resequencer changes the ABCD grouping of a sequence of video fields derived from a motion picture film via 3-2 pulldown so as to allow that sequence of video fields to be cut into or edited with a second sequence of similarly derived video fields, the cut or edit occurring at any desired position, without any artifacts. The resequencer comprises eight field stores. In each video field time, an input video field is stored into one field store and an output video field is read from a different field store. The particular field stores into which fields are read and written in each video field time are chosen so as to achieve the desired change in ABCD grouping.

10 Claims, 7 Drawing Sheets

METHOD AND APPARATUS FOR CHANGING PHASE OF VIDEO PROGRAM MATERIAL TAKEN FROM 24 FRAME PER SECOND FILM

RELATED APPLICATIONS

This application is a continuation of application Ser. No. 09/465,118, filed Dec. 16, 1999, which was a continuation of Ser. No. 09/167,073, filed Oct. 6, 1998 now abandoned which was a continuation of application Ser. No. 08/770,405, filed Dec. 20,1996 now abandoned.

BACKGROUND OF THE INVENTION

1. Field of the Invention

This invention relates to video post-production editing systems, and in particular to editing systems which are used to edit program material taken from standard 24-frame-per-second film.

2. Related Art

Movies and videotapes give the illusion of motion by playing back rapidly a sequence of still images called "frames." Commercial movies are designed to be played back at 24 frames per second. In contrast, under the American NTSC television standard, videotapes are designed to be played back at 29.97 frames per second. Under high-definition video standard SMPTE-240M, high-definition videotapes are designed to be played back at 30 frames per second. In Europe, under the PAL and SECAM television standards, videotapes are designed to be played back at 25 frames per second.

Besides the difference in frame rates, video playback differs in another important way from movie playback. In video, the screen image is divided up into a large number of horizontal scan lines. The American NTSC standard provides for 525 scan lines on the screen (not all of which are visible), whereas the European PAL standard provides for 625 scan lines. In videotapes, the scan lines that correspond to each frame are divided into two "fields," the first containing the even-numbered scan lines and the second the odd-numbered scan lines. On videotape, to record a frame, one records first one of the fields and then the other field. Thus, a video frame contains two fields, and an SMPTE-240M videotape is designed to be played back at 60 fields per second, corresponding to 30 frames per second.

It is common to move program material from motion picture film to videotape. A machine which can perform this function is called a "telecine." For further background on telecines, see U.S. Pat. No. 5,428,387, issued to the present inventors. Nowadays, it is also common to move program material from videotape to film, particularly inasmuch as high definition video equipment allows this operation to be carried out without degradation in image quality. Either process requires a way of bridging the gap between the 24 frames per second used in film and the 25, 29.97, or 30 frames per second used in videotape.

When converting 24 frame per second film to 29.97/30 frame per second videotape, the standard process used to bridge the frame rate gap is called "3-2 pulldown." In this process, even-numbered frames of the film are recorded as two successive fields, which are identical (except that they correspond to different sets of scanlines). Odd-numbered frames of the film are recorded as three successive fields, which are also identical (except that they correspond to different sets of scanlines). Thus, every pair of frames in the film, which takes $\frac{1}{12}$th of a second to play back at the film playback rate of 24 frames per second, is converted into five video fields, which also take $\frac{1}{12}$th of a second to play back at a video playback rate of 60 fields per second.

Figure 1:
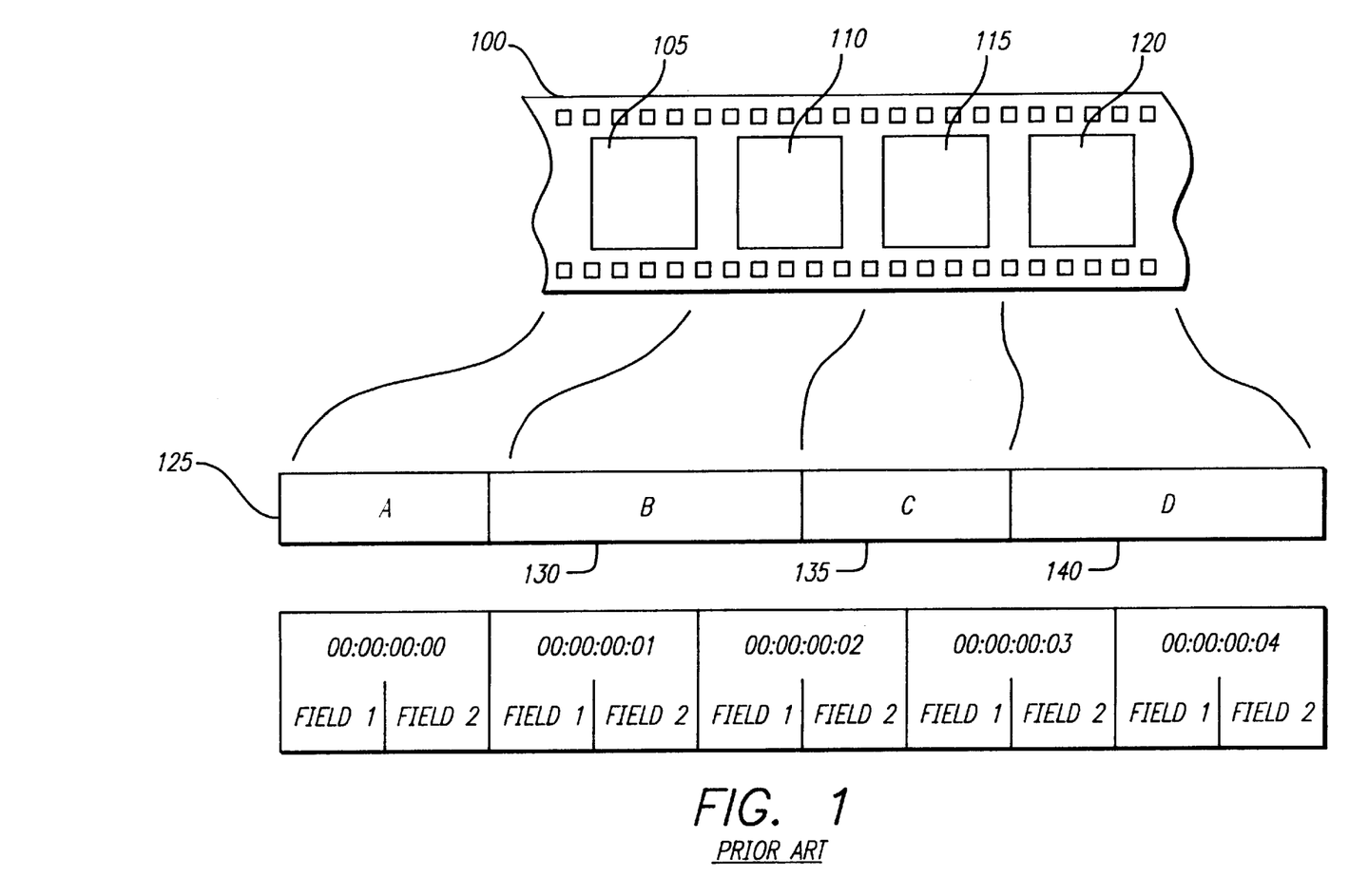
FIG. 1 (prior art) depicts the four types of videotape fields, A, B, C, and D, which exist in a 60-field-per-second videotape derived from motion picture film.

As depicted in FIG. 1, videotapes derived from a film 100 by means of 3-2 pulldown consist of a sequence of groups of fields such as 125, 130, 135 and 140, each field group corresponding to one film frame such as 105. There are actually four different types of field groups, which we call A, B, C, and D. An A field group consists of two fields corresponding to one videotape frame and to one film frame. A B field group consists of three fields, the first two belonging to one videotape frame and the third to the next videotape frame, with the three fields corresponding to one film frame. A C field group consists of two fields, corresponding to two different videotape frames but only one film frame. A D field group consists of three videotape fields, the first belonging to one videotape frame and the other two belonging to the next videotape frame, but all corresponding to one film frame.

It is important to note the following difference between A and C field groups. Even though both consist of two fields corresponding to one film frame, the first field of an A field group is the first field of a video frame, and thus it corresponds to even-numbered scanlines. In contrast, the first field of a C field group is the second field of a video frame, and thus it corresponds to odd-numbered scanlines. There is a similar difference between B and D field groups. The first field of a B field group is the first field of a video frame, and thus it corresponds to even-numbered scanlines. In contrast, the first field of a D field group is the second field of a video frame, and thus it corresponds to odd-numbered scanlines.

A videotape derived from film by means of 3-2 pulldown thus consists of a sequence of field groups in the order ABCD, ABCD, ABCD, etc. Notably, the first two fields of the videotape will be an A field group, and thus it will be possible to know, just from the location of a field within the videotape, whether it belongs to an A, B, C, or D field group. In modern videotape editing, the frames are referred to by "time codes," which take the form hh:mm:ss:ff, where hh denotes hours, mm minutes, ss seconds, and ff frames (not fields). Because there are six sets of A, B, C, and D field groups in each second's worth of videotape, each set of field groups encompassing five video frames, it is possible to know just from the video frame number ff of the time code whether the fields of that video frame belong to A, B, C, or D field groups. In particular, the first video frame of each second consists of two fields forming an A field group, the second video frame consists of two fields that make up part of a B field group, the third video frame consists of one field from a B field group and one from a C field group, and so forth.

It is common, in the process of editing videotape, to cut, wipe, or dissolve between two or more sources of video. Post-production video editing systems of the types known in the art permit this cutting, wiping, or dissolving to be performed at any video frame boundary.

Figure 2:
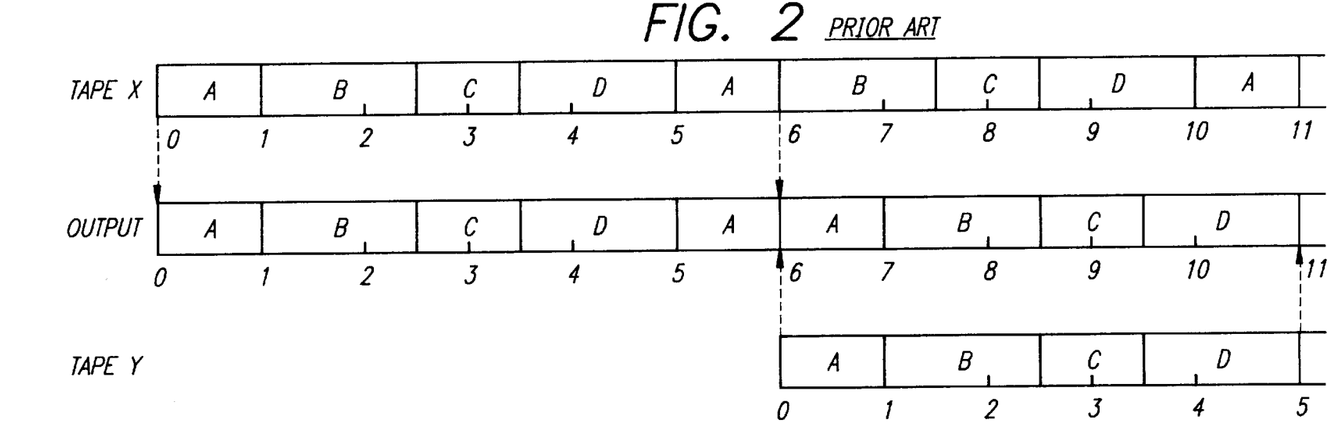
FIG. 2 (prior art) depicts the video field sequences in an editing operation which, under prior art editing systems, would result in an irregular ABCD sequence on the output videotape.

Consider a typical editing scenario, depicted in FIG. 2. The user of the editing system has two source videotapes, tape X and tape Y, derived from film by means of 3-2 pulldown. The user wishes to copy the first six video frames, numbered 0 through 5 in FIG. 2, from tape X onto the output, followed by five video frames, numbered 0 through 4, from tape Y. Because both tapes were obtained by 3-2 pulldown, tape X's video frames 0 through 5 come from five film frames and have an ABCDA sequence, while tape X's video frames 0 through 4 come from four film frames and have an ABCD sequence. If this operation were carried out on a prior art editing system, first the six video frames 0 through 5 in tape X will be copied to the output, which will give the output tape an initial ABCDA sequence. Then the five video frames 0 through 4 from tape Y will be copied to the output. This additional copy operation will result in the output having an undesirable irregular ABCDAABCD sequence, as shown in FIG. 2.

Suppose now that the operation depicted in FIG. 2 were a dissolve rather than a cut, so that contents of the two tapes are blended, with an increasing proportion of tape Y content being used as time advances; It is readily seen that the output video frame numbered 7 consists of two fields. The first field of output frame 7 is derived from tape X's B film frame (spanning the video frames numbered 6 and 7) blended with tape Y's B film frame (spanning video frames numbered 1 and 2). The second field of output frame 7, however, is derived from a different film frame on tape X, the C film frame spanning video frames 7 and 8. This is also undesirable.

As this example shows, even if the source videotapes X and Y are derived from film via 3-2 pulldown and have perfect ABCD sequences, an editing operation can potentially result in irregularities in the ABCD sequence of the output videotape. These irregularities can give rise to visible artifacts when the output videotape is converted back to film. Even a single cut can result in all the videotape after the cut having an offset ABCD sequence, so that the time code no longer allows one to determine whether the fields of a frame belong to A, B, C, or D field groups.

One technique for avoiding this difficulty is to limit the resolution at which cutting, wiping and dissolving take place so that these operations are only allowed at the boundary of an ABCD structure. Since an ABCD structure is five videotape frames long, i.e., one-sixth of a second, this greatly restricts the editor's ability to cut as artistic considerations dictate (e.g., to synchronize with sound effects). This loss of creative control is unacceptable in practice.

SUMMARY OF THE INVENTION

It is therefore an objective of the invention to create an editing system for videotape which allows cut and dissolve at the highest temporal resolution consistent with preserving the ABCD sequence of field groups. It is a further objective to achieve this by means of a modest alteration of existing videotape editing systems, without requiring any radical changes in existing systems.

To achieve these objectives, the invention makes use of a novel apparatus called a resequencer. The resequencer contains eight field stores, i.e., devices capable of storing the contents of a video field at the resolution corresponding to the video equipment being used (e.g., NTSC or SMPTE-240M). A video tape player is connected to the input of the resequencer, and the resequencer generates video at its output. One resequencer is needed for each source of video going into the editing system, so that forexample if the editing system is capable of combining video from three video tape players to produce the output videotape, three resequencers are needed.

The invention also makes use of a controller interfaced to the resequencers and commanding them. The controller commands the resequencer to perform the appropriate transformations between its input and output so that the resequencers' outputs have an ABCD sequence of field groups which matches the desired ABCD sequence in the output videotape.

Through the combined action of the controller and the resequencer, it is thus possible to achieve the objective of performing cuts, wipes, and dissolves between two video sources while preserving the output videotape's regular ABCD sequence of field groups. These cuts, wipes, and dissolves can be carried out with the maximum temporal resolution which the sources permit, so that the cut, wipe, or dissolve can start with the beginning of any A, B, C, or D field group in each source and be placed at the beginning of any A, B, C, or D field group in the output.

DETAILED DESCRIPTION OF THE INVENTION

In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

Figure 3:
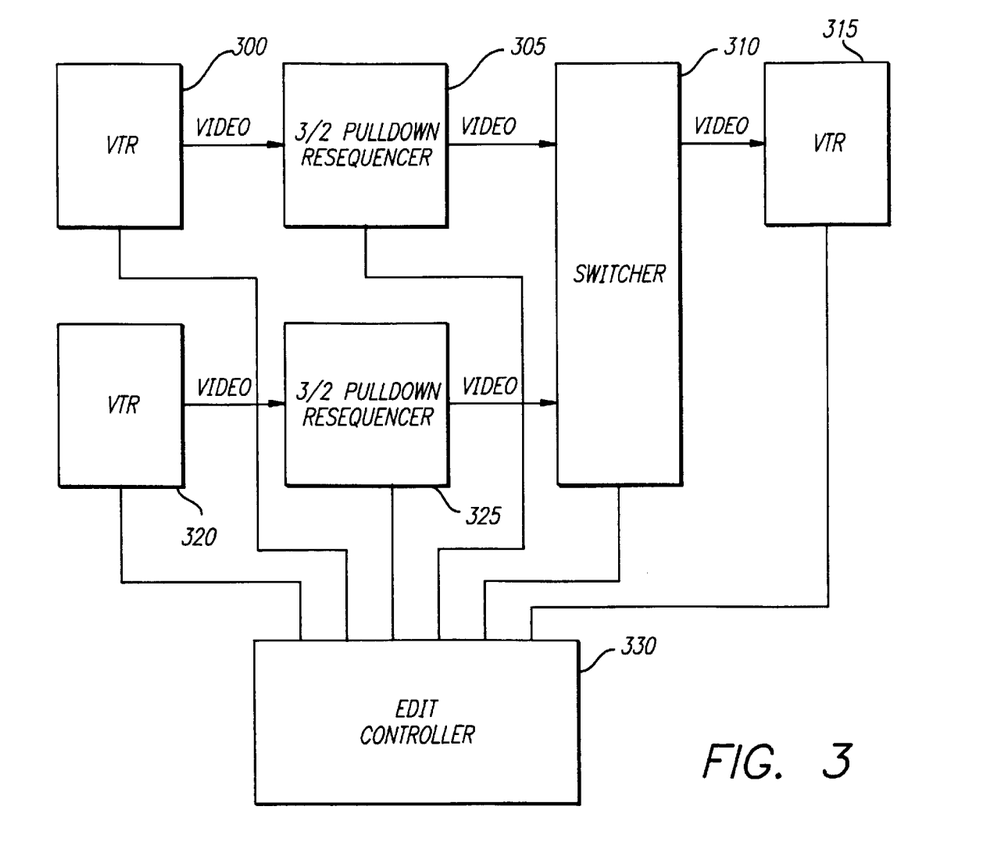
FIG. 3 depicts how the resequencer of the invention fits into an overall video editing system.

The invention is designed to be used as part of a video post-production editing system of the kind depicted schematically in FIG. 3. Such a video editing system employs a controller 330 which allows user control of the editing process. The video editing system further comprises two or more source videotape players 300, 320, two or more resequencers 305, 325, a switcher 310, and a videotape recorder 315 on which the output video is recorded. One resequencer is connected between each source videotape player and the switcher 310. Video editing systems also typically contain a console, a video monitor, an audio mixer, speakers, and other equipment not shown.

Figure 4:
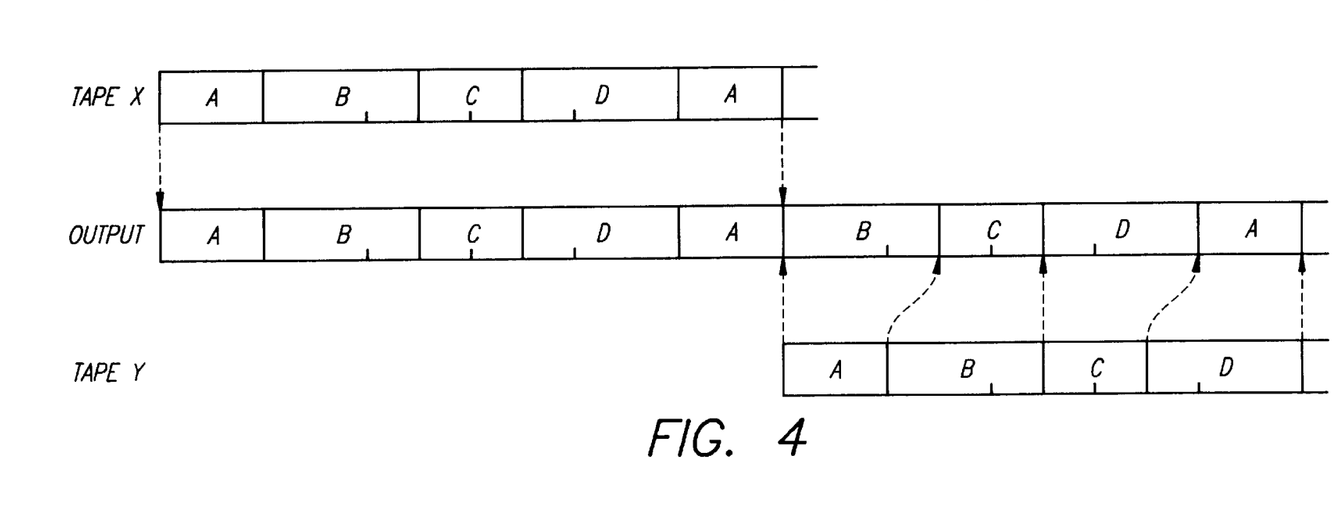
FIG. 4 shows how the video editing operation of FIG. 2 would be carried out using the resequencer of the invention.

FIG. 4 shows how the editing operation depicted in FIG. 2 works when the resequencers of the invention are in use. The first six video frames on tape X are written to the output as before, as five field groups in the sequence ABCDA. However, the five starting video frames from tape Y are transformed from ABCD into BCDA by the resequencers before being written onto the output tape. This transformation, also referred to as a "phase change," ensures that the output tape has the desired regular ABCD sequence of field groups.

The transformation of an ABCD sequence of field groups into a BCDA sequence requires the resequencer to duplicate certain of the video fields and drop others. Specifically, for the initial A field group from tape Y in FIG. 4, comprising two fields, the resequencer must generate the three fields corresponding to the B field group which is to be written onto the output tape. The resequencer must do so by duplicating the first field in the input A field group to obtain both the first and third fields of the output B field group. In addition, the B field group from tape Y in FIG. 4 needs to be converted to a C field group, and thus its three fields need to be transformed into two. This transformation is accomplished by dropping the last of the three fields of the B field group and reversing the order of the other two. The reversal is required because the first field in a B field group is the first field of a video frame and thus corresponds to even scanlines, while the first field of a C field group is the second field of a video frame and thus corresponds to odd scanlines. Similarly, the C field group from tape Y needs to be converted to a D field group. This conversion is accomplished just as the A-to-B conversion was, by duplicating the first field in the input C field group to obtain both the first and third fields of the output D field group. Finally, the D field group from tape Y needs to be converted into an A field group; again, this is accomplished by dropping the last field of the D field group and reversing the order of the other two.

While the example of FIG. 4 required the resequencer to convert the sequence of field groups on tape from ABCD to BCDA, other editing operations may require that a sequence of field groups be converted from ABCD to CDAB or from ABCD to DABC, or that the output sequence be ABCD just like the Input sequence. It is thus seen that a resequencer inust operate in four different modes, which may conveniently be designated as ABCD (meaning that an ABCD input is converted to ABCD output), BCDA (meaning that an ABCD input is converted to BCDA output), CDAB (meaning that at ABCD input is converted to CDAB output), and DABC (meaning that an ABCD input is converted to DABC output).

Figure 5:
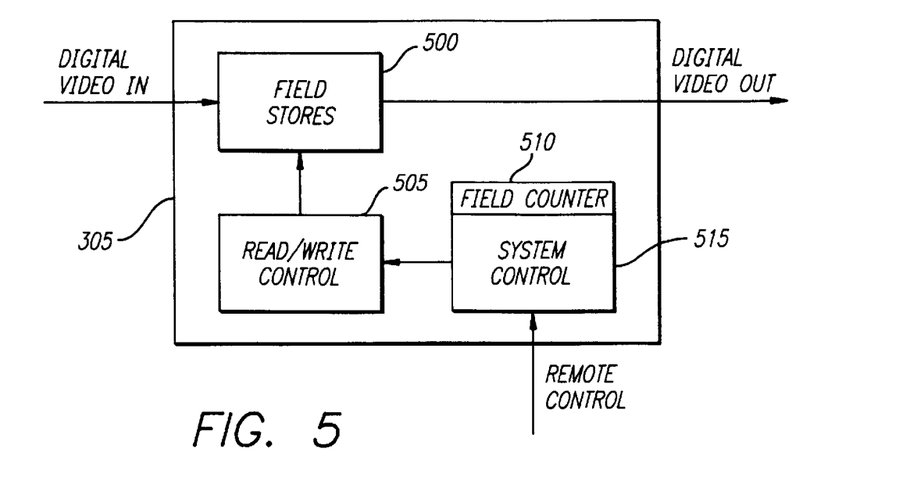
FIG. 5 depicts the components which make up the resequencer of the invention.

The resequencer 305 or 325 internally has the structure shown in FIG. 5. It consists of a set of eight field stores 500, a read-write control 505 for the field stores 500, and a system control 515 which communicates with the edit controller 330. The incoming and outgoing fields are preferably communicated in digital form, in any of a number of digital video formats well known in the art. In each field time interval (¹⁄₆₀th of a second), the incoming field is written into one of the eight field stores 500, while another of the field stores 500 is read and directed to the resequencer's output. The resequencer also contains a field counter 510 which increments each time a new field is output, i.e. every 60th of a second. The number stored in this counter is referred to as the field count. The field count is taken modulo 10 so that it varies only from 0 to 9; this may conveniently be accomplished by resetting it to 0 each time it would otherwise increment past 9. The system control 515 decides which field stores to write and reach in each field time interval as a function of the mode and the field count. The manner in which this is decided is explained below.

Figure 6:
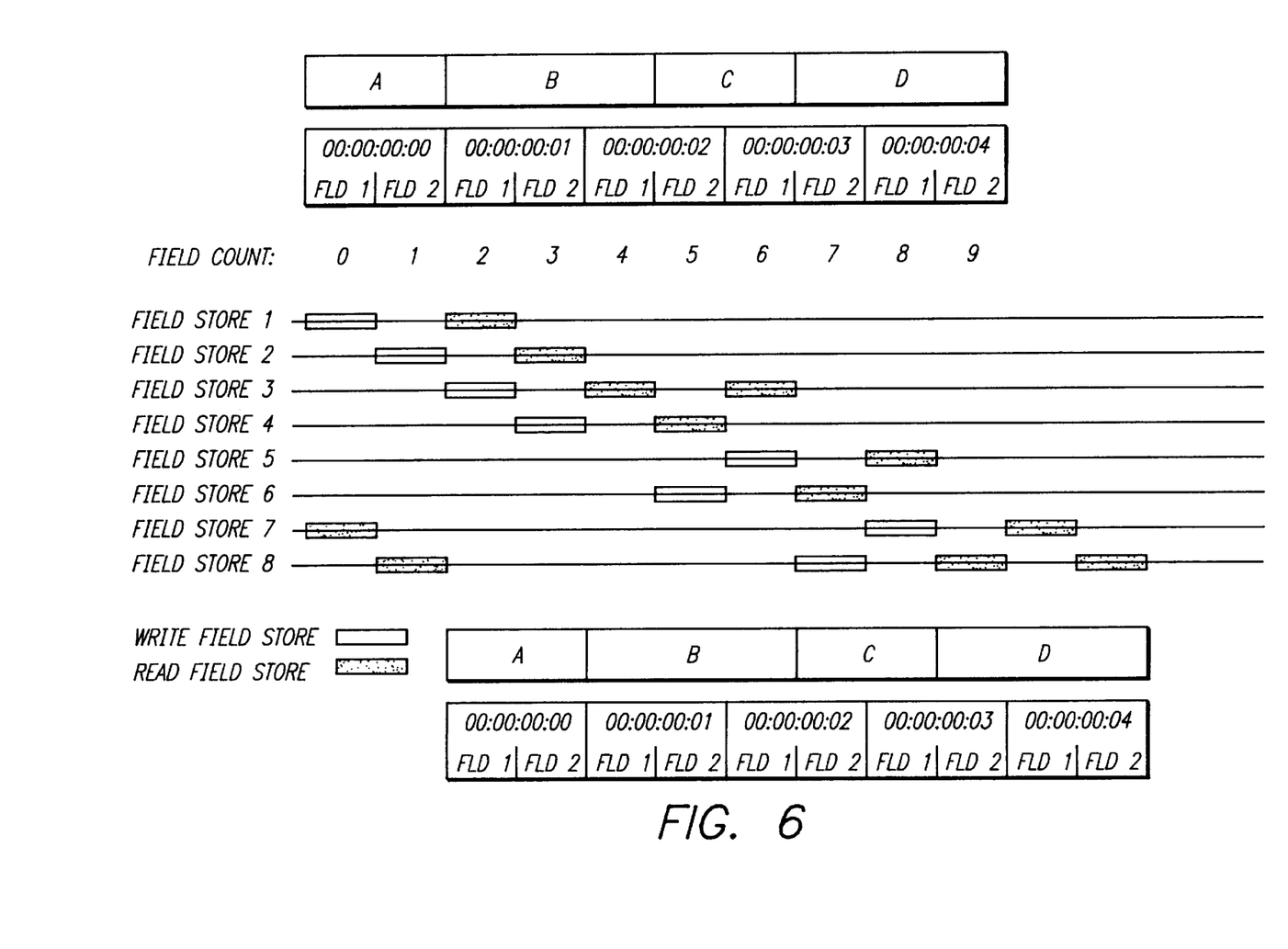
FIGS. 6 through 9 depict the frame stores which are used when the resequencer is operating in ABCD, BCDA, CDAB, and DABC modes respectively.

FIGS. 6 through 9 define, for each of the four modes, which of the eight field stores 500 are read and written in each field time interval as a function of the field count and the mode. FIG. 6 shows which field stores are read and written as a function of the field count when the resequencer is operating in ABCD mode. When the field count is 0, the first column of FIG. 6 shows that field store 1 is written and field store 7 is read. When the field count is 1, the second column shows that field store 2 is written and field store 8 is read. When the field count is 2, field store 3 is written and field store 1 is read. When the field count is 3, field store 4 is written and field store 2 is read. When the field count is 4, field store 3 is read and no field store is written. When the field count is 5, field store 6 is written and field store 4 is read. When the field count is 6, field store 5 is written and field store 3 is read. When the field count is 7, field store 8 is written and field store 6 is read. When the field count is 8, field store 7 is written and field store 5 is read. Finally, when the field count is 9, field store 8 is read and no field store is written.

It should be noted from FIG. 6 that the resequencer introduces a time delay between its input and its output. Specifically, in ABCD mode, the incoming field that arrives when the field count is 0 is sent to the output when the field count is 2, i.e. two field times (¹⁄₃₀th of a second)-later. The edit controller 330 takes this time delay into account in the overall synchronization of the system.

Figure 7:
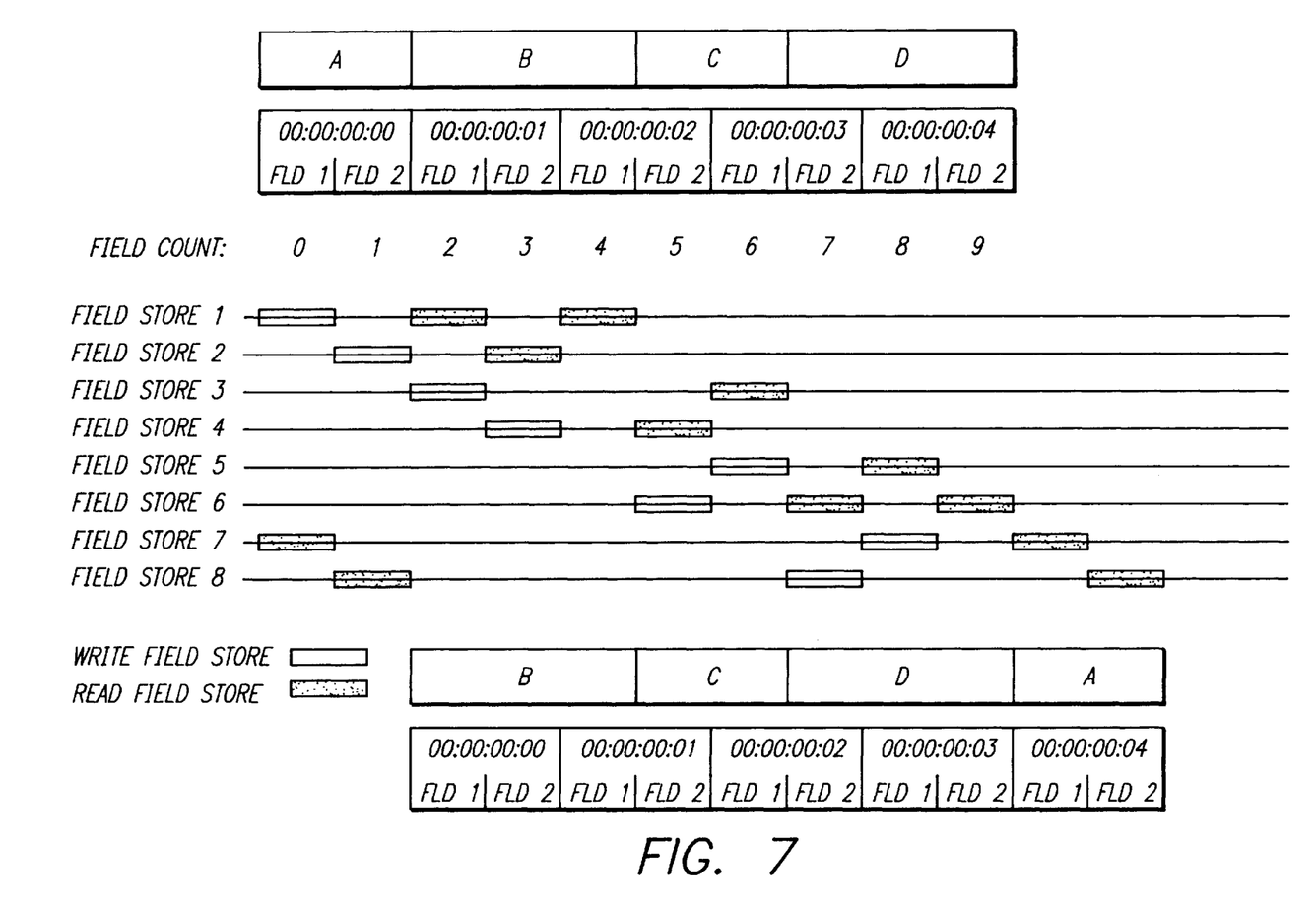
Figure 8:
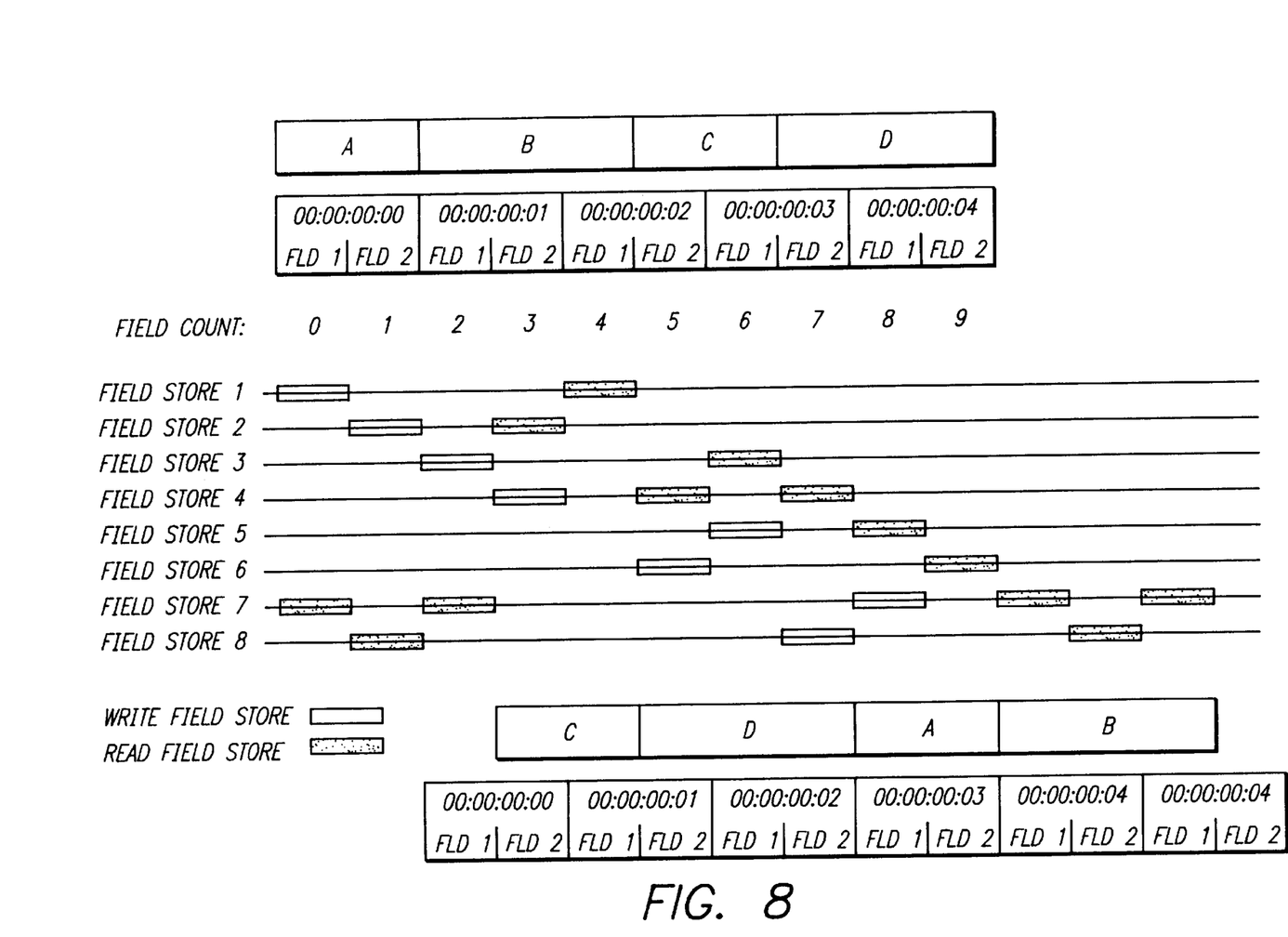
Figure 9:
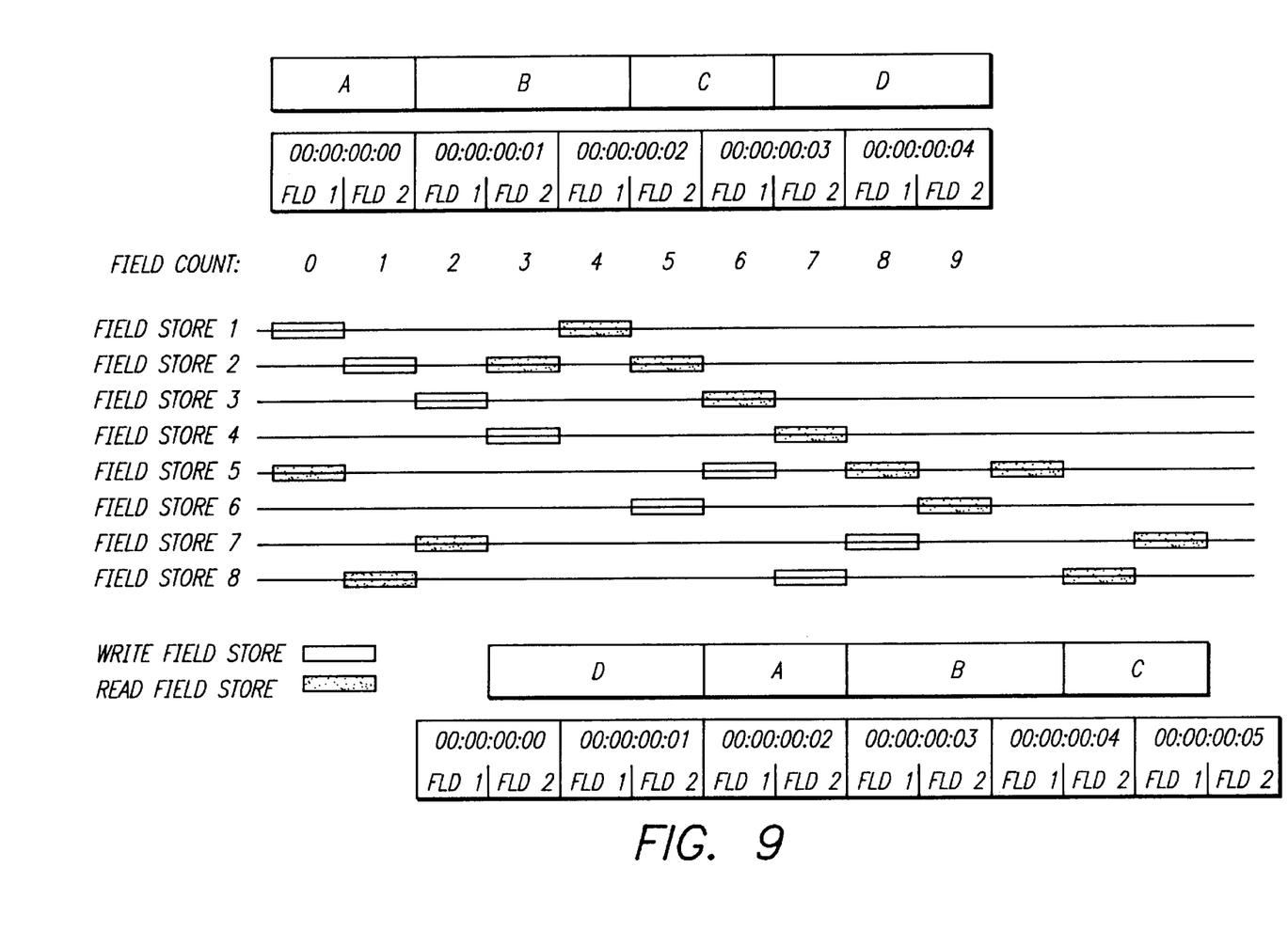

FIG. 7 similarly defines which field stores are read and written when the resequencer is operating in BCDA mode. FIG. 7 shows, for example, that when the field count is 0, field store 1 is written and field store 7 is read. When the field count is 1, field store 2 is written and field store 7 is read. When the field count is 2, field store 3 is written and field store 1 is read. The field stores which are read and written for the remaining values of field count may easily be read from the remaining columns of FIG. 7, as was done in the discussion of FIG. 6 above. FIG. 8 shows the field stores which are read and written when the resequencer is operating in CDAB mode, and FIG. 9 shows the field stores which are read and written when the resequencer is operating in DABC mode. When the resequencer is operating in these latter two modes, the time delay between input and output is 3 field times (¹⁄₂₀th of a second).

In the specification of the resequencer's operation which has been given so far, the resequencer has always worked with a sequence of field groups on the source videotape which starts with an A field group. However, the resequencer is also capable of starting with a B, C, or D field group. To start with a B, C, or D field group, the resequencer's field count starts with a value different from zero. For example, suppose that the resequencer operates in BCDA mode, as in FIG. 7, and the sequence of field groups in the source starts with a C field group. It is then merely necessary to start the resequencing process with a field count of 5 rather than 0, as is readily seen by examining FIG. 7. The controller 330 preferably sends the resequencer an indication of what type of field group the first source field on each source tape belongs to. This indication lets the resequencer know which field count to start out with.

The choice of which field stores to read and write in FIGS. 6 through 9 is only exemplary. Those skilled in the art will recognize that many other choices are possible which still achieve the necessary ABCD sequence conversions called for by the chosen mode.

Although each resequencer 305, 325 is shown in FIG. 3 as a separate box, it will be clear to those skilled in the art that a number of resequencers can be packaged inside one box, sharing a common power supply and other elements, such as the RS-422 link to the edit controller 330. Furthermore, although the preferred embodiment has been described in terms of videotape editing, it will be appreciated by those skilled in the art that the invention can also be practiced with video which is stored on other media, such as laser discs.

We claim:

1. A system for resequencing at least one of a plurality of input video sequences which upon combining without resequencing would be subject to generating motion artifacts, and for combining and integrating the plurality of input video sequences so as to generate a composite output video sequence with a consistent video sequence without motion artifacts which otherwise would be subject to being generated thereby, comprising:

a plurality of input video sequences derived from film source material, each of which includes a 3/2 pulldown video sequence, at least one of which if combined with another without resequencing would be subject to generating motion artifacts;

a resequencer, for resequencing the 3/2 pulldown video sequence of at least one of the plurality of film-source derived input video sequences so as to generate a resequenced 3/2 pulldown video sequence; and     a combining element for combining the plurality of film-source derived input video sequences, including the at least one film-source derived input video sequence which includes the resequenced 3/2 pulldown video sequence, into a composite video output sequence with a consistent 3/2 pulldown video sequence without motion artifacts which otherwise would be subject to being generated thereby.

2. The system of claim 1, wherein the at least one input video sequence includes a field group sequence which comprises a plurality of video fields and a plurality of video field groups, and the resequencer is adapted to store the video fields and to enable the video fields to be resequenced.

3. The system of claim 2, further comprising a controller for interfacing with and commanding the resequencer to resequence the stored video fields into resequenced video fields.

4. The system of claim 3, wherein the resequencer is adapted to read and write each of the plurality of video fields in each of the plurality of field stores, at each of the plurality of field counts, for resequencing the plurality of video fields responsive to the control of the controller.

5. The system of claim 1, wherein the resequencer includes a plurality of field stores for storing the plurality of video fields in the at least one input video sequence, wherein each of the plurality of video fields is stored in one of the plurality of field stores, and the resequencer further includes a plurality of field counts, for resequencing each of the plurality of video fields in each of the plurality of field stores.

6. A method of resequencing at least one of a plurality of input video sequences which upon combining without resequencing would be subject to generating motion artifacts, and of combining and integrating the plurality of input video sequences so as to generate a composite output video sequence with a consistent video sequence without motion artifacts which otherwise would be subject to being generated thereby, in a system which comprises a plurality of input video sequences derived from film source material, each of which includes a 3/2 pulldown video sequence, at least one of which if combined with another without resequencing would be subject to generating motion artifacts, a resequencer, for resequencing the 3/2 pulldown video sequence of the at least one of the plurality of film-source derived input video sequences so as to generate a resequenced 3/2 pulldown video sequence, and a combining element for combining the plurality of film-source derived input video sequences, including the at least one film-source derived input video sequence which includes the resequenced 3/2 pulldown video sequence, into a composite video output sequence with a consistent 3/2 pulldown video sequence without motion artifacts which otherwise would be subject to being generated thereby, wherein the method comprises:

resequencing the 3/2 pulldown video sequence of the at least one film-source derived input video sequence so as to generate a resequenced 3/2 pulldown video sequence; and     combining and integrating the plurality of film-source derived input video sequences, including the at least one film-source derived input video sequence which includes the resequenced 3/2 pulldown video sequence, into a composite video output sequence with a consistent 3/2 pulldown video sequence without motion artifacts which otherwise would be subject to being generated thereby.

7. The method of claim 6, wherein the at least one input video sequence includes a field group sequence which comprises a plurality of video fields and a plurality of video field groups, and the resequencer is adapted to store the video fields and to enable the video fields to be resequenced, and wherein resequencing further comprises storing the video fields and enabling the video fields to be resequenced.

8. The method of claim 7, further comprising a controller for interfacing with and commanding the resequencer to resequence the stored video fields into resequenced video fields, further comprising interfacing the controller with the resequencer and commanding the resequencer by the controller to resequence the stored video fields into resequenced video fields.

9. The method of claim 6, wherein the resequencer includes a plurality of field stores for storing the plurality of video fields in the at least one input video sequence, wherein each of the plurality of video fields is stored in one of the plurality of field stores, and the resequencer further includes a plurality of field counts, for resequencing each of the plurality of video fields in each of the plurality of field stores, and wherein resequencing further comprises resequencing each of the plurality of video fields in each of the plurality of field stores.

10. The method of claim 9, wherein the resequencer is adapted to read and write each of the plurality of video fields in each of the plurality of field stores, at each of the plurality of field counts, for resequencing the plurality of video fields responsive to the control of the controller, and wherein resequencing includes controlling the resequencer by the controller to read and write each of the plurality of video fields in each of the plurality of field stores at each of the plurality of field counts.

\* \* \* \* \*